US012363599B2

(12) United States Patent
Cui et al.

(10) Patent No.: US 12,363,599 B2
(45) Date of Patent: Jul. 15, 2025

(54) NETWORK CONFIGURATION OF CSI-RS BASED RADIO RESOURCE MANAGEMENT

(71) Applicant: Apple Inc., Cupertino, CA (US)

(72) Inventors: Jie Cui, San Jose, CA (US); Dawei Zhang, Saratoga, CA (US); Haitong Sun, Cupertino, CA (US); Herbert R. Dawid, Herzogenrath (DE); Hong He, San Jose, CA (US); Yang Tang, San Jose, CA (US); Yihong Qi, Santa Clara, CA (US); Yushu Zhang, Beijing (CN)

(73) Assignee: Apple Inc., Cupertino, CA (US)

( * ) Notice: Subject to any disclaimer, the term of this patent is extended or adjusted under 35 U.S.C. 154(b) by 432 days.

(21) Appl. No.: 17/593,417

(22) PCT Filed: Aug. 5, 2020

(86) PCT No.: PCT/CN2020/107088
§ 371 (c)(1),
(2) Date: Sep. 17, 2021

(87) PCT Pub. No.: WO2022/027309
PCT Pub. Date: Feb. 10, 2022

(65) Prior Publication Data
US 2022/0303842 A1    Sep. 22, 2022

(51) Int. Cl.
*H04W 36/00* (2009.01)
(52) U.S. Cl.
CPC .............. *H04W 36/0094* (2013.01)
(58) Field of Classification Search
CPC .................................. H04W 36/0094
See application file for complete search history.

(56) References Cited

U.S. PATENT DOCUMENTS 7,693,106 B1 * 4/2010 Ishikawa ............... H04W 48/16
455/436
11,716,640 B2 * 8/2023 Siomina ................. H04W 76/28
370/329
(Continued)

FOREIGN PATENT DOCUMENTS

CN      110100492      8/2019
CN      110521146      11/2019
(Continued)

OTHER PUBLICATIONS

Fujitsu, "On remaining details of synchronization signal", 3GPP TSG RAN WG1 Meeting 90bis, R1-1717713, Oct. 8, 2017, 7 sheets.
(Continued)

*Primary Examiner* — Michael Thier
*Assistant Examiner* — Nevena Zecevic Sandhu
(74) *Attorney, Agent, or Firm* — Fay Kaplun & Marcin, LLP

(57) ABSTRACT

A base station of a network operates as a serving cell for a user equipment (UE) and configures the UE to measure channel state information reference signals (CSI-RS) from the target cell. The base station determines whether a target cell of the network transmits Synchronization Signal Block (SSB) information and transmits, to the UE, a measurement configuration message indicating the UE is to measure channel state information reference signals (CSI-RS) from the target cell, wherein the measurement configuration message does not include SSB information for the target cell but further comprises an indication of whether the target cell transmits SSBs.

20 Claims, 8 Drawing Sheets

(56) References Cited

U.S. PATENT DOCUMENTS

| | | |
|---|---|---|
| 11,864,038 B2 | 1/2024 | Ingale et al. |
| 2012/0076106 A1 | 3/2012 | Bhattad et al. |
| 2015/0092768 A1* | 4/2015 | Ng .................. H04W 48/16 370/350 |
| 2015/0372779 A1* | 12/2015 | Lim .................. H04J 11/005 370/338 |
| 2019/0166513 A1* | 5/2019 | Lin .................. H04W 24/10 |
| 2019/0313272 A1 | 10/2019 | Zhou et al. |
| 2020/0014447 A1 | 1/2020 | Yiu et al. |
| 2020/0367187 A1* | 11/2020 | Palenius ........... H04W 56/0005 |
| 2021/0136773 A1 | 5/2021 | Yang et al. |
| 2021/0144768 A1 | 5/2021 | Isokangas et al. |
| 2022/0022021 A1* | 1/2022 | Bi .................. H04W 52/58 |
| 2022/0303842 A1 | 9/2022 | Cui et al. |
| 2022/0322308 A1 | 10/2022 | He et al. |
| 2023/0056263 A1 | 2/2023 | Kim et al. |
| 2023/0379769 A1 | 11/2023 | Ramachandra et al. |

FOREIGN PATENT DOCUMENTS

| | | |
|---|---|---|
| CN | 110622584 | 12/2019 |
| CN | 110662307 | 1/2020 |
| CN | 110719139 | 1/2020 |
| CN | 110741695 | 1/2020 |
| WO | 2019/098914 | 5/2019 |
| WO | 2019/196098 | 10/2019 |

OTHER PUBLICATIONS

Spreadtrum Communications, "Remaining issues for CSI-RS based RRM measurement"; 3GPP TSG RAN WG1 Meeting #93; R1-1806407; May 25, 2018; 4 sheets.

Intel Corporation, "SSB and CSI-RS configuration in measurement object"; 3GPP TSG RAN WG2 Meeting #101; R2-1802983; Mar. 2, 2018; 5 sheets.

* cited by examiner

NETWORK CONFIGURATION OF CSI-RS BASED RADIO RESOURCE MANAGEMENT

BACKGROUND

A user equipment (UE) may operate on one or more types of networks. While operating on the network, the UE typically reports information back to the network. The information that is reported back may be based on measurements performed by the UE based on signals transmitted by base stations of the network. Fifth generation (5G) new radio (NR) base stations may transmit various types of reference signals that are measured by UEs operating on the 5G network. One example of a reference signals transmitted by 5G base stations are channel state information reference signals (CSI-RS). The UE may measure the CSI-RS and report information such as CSI-RS received power (CSI-RSRP), CSI-RS received signal strength (CSI-RSSI) and CSI-RS received quality (CS-RSRQ) back to the base station.

The UE may measure these signals for both the base station on which it is currently camped and neighbor base stations. The base stations and 5G network may then use this information for various purposes such as channel estimation, mobility, etc. However, for the UE to measure the CSI-RS, the UE should be aware of the resources (e.g., frequency and time) at which the CSI-RS are transmitted by the various base stations of the network.

SUMMARY

Some exemplary aspects are related to a method performed by a base station of a network operating as a serving cell for a user equipment (UE). The method includes determining whether a target cell of the network transmits Synchronization Signal Block (SSB) information and transmitting, to the UE, a measurement configuration message indicating the UE is to measure channel state information reference signals (CSI-RS) from the target cell, wherein the measurement configuration message does not include SSB information for the target cell but further comprises an indication of whether the target cell transmits SSBs.

Other exemplary aspects are related to a base station of a network operating as a serving cell for a user equipment (UE). The base station has one or more processors and a transceiver. The one or more processors are configured to determine whether a target cell of the network transmits Synchronization Signal Block (SSB) information and configure a measurement configuration message indicating the UE is to measure channel state information reference signals (CSI-RS) from the target cell, wherein the measurement configuration message does not include SSB information for the target cell but further comprises an indication of whether the target cell transmits SSBs. The transceiver transmits the measurement configuration message to the UE.

Further exemplary aspects are related to a computer readable storage medium having instructions that are executable by a processor. Executing the instructions cause the processor to perform operations that include determining whether a target cell of the network transmits Synchronization Signal Block (SSB) information and transmitting, to the UE, a measurement configuration message indicating the UE is to measure channel state information reference signals (CSI-RS) from the target cell, wherein the measurement configuration message does not include SSB information for the target cell but further comprises an indication of whether the target cell transmits SSBs.

DETAILED DESCRIPTION

Figure 1:
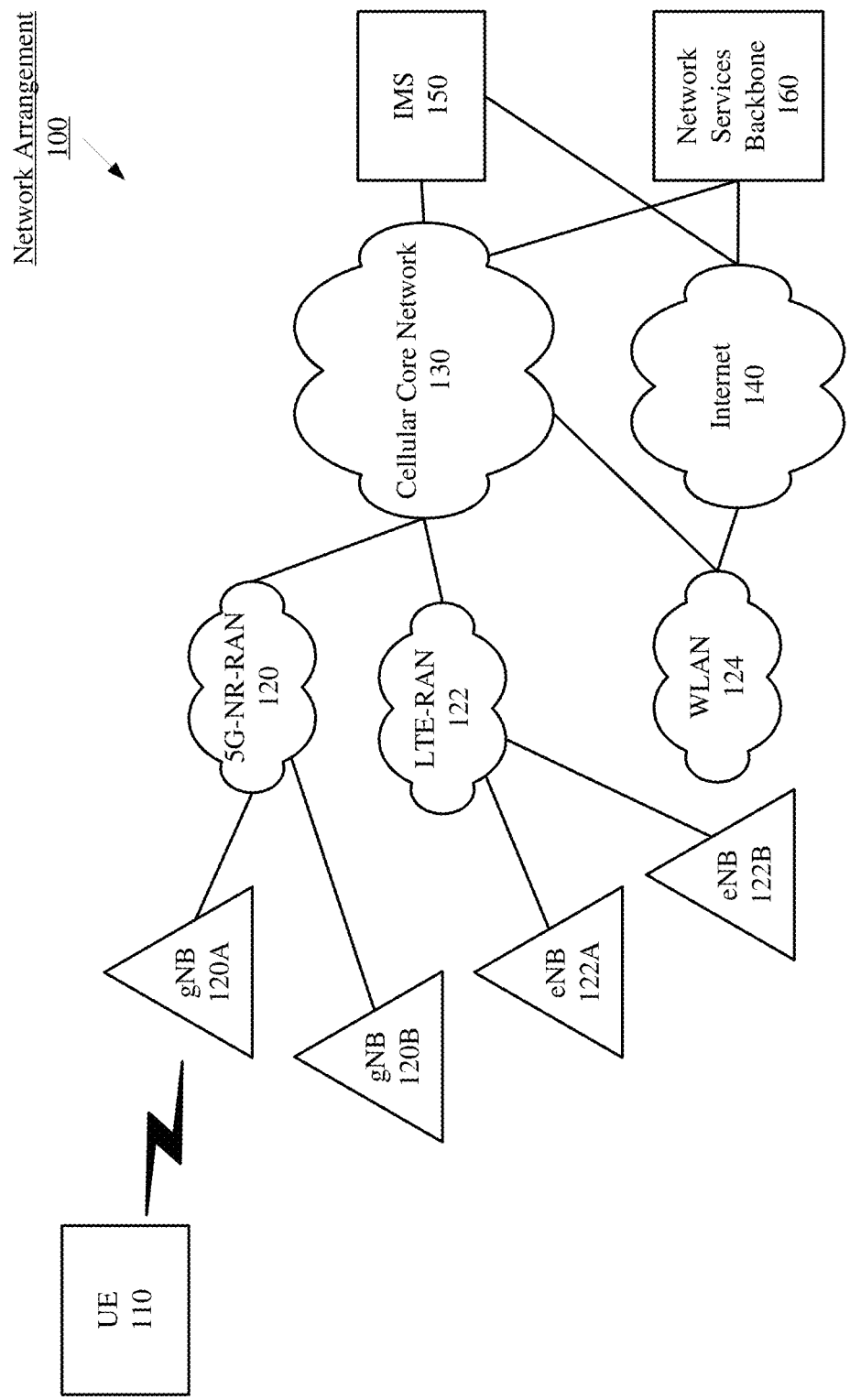
FIG. 1 shows an exemplary network arrangement according to various exemplary aspects.

The exemplary aspects may be further understood with reference to the following description and the related appended drawings, wherein like elements are provided with the same reference numerals. The exemplary aspects relate to a user equipment (UE) performing additional synchronization to perform CSI-RS measurements on a target cell when an associated Synchronization Signal Block (SSB) is absent from a measurement configuration. In some exemplary aspects, a serving cell provides the UE with additional information to assist the UE in the additional synchronization.

The exemplary aspects are described with regard to a UE. However, reference to a UE is merely provided for illustrative purposes. The exemplary aspects may be utilized with any electronic component that may establish a connection to a network and is configured with the hardware, software, and/or firmware to exchange information and data with the network. Therefore, the UE as described herein is used to represent any electronic component.

The exemplary aspects are also described with reference to the CSI-RS radio resource management (RRM) signaling and measurements with in a 5G NR network. However, a 5G NR network and other different networks may transmit different types of reference signals or pilot signals for various purposes. Those skilled in the art will understand how to apply the principles described herein for 5G CSI-RS RRM to other types of reference signals and other types of network.

FIG. 1 shows an exemplary network arrangement 100 according to various exemplary aspects. The exemplary network arrangement 100 includes a UE 110. Those skilled in the art will understand that the UE 110 may be any type of electronic component that is configured to communicate via a network, e.g., mobile phones, tablet computers, desktop computers, smartphones, phablets, embedded devices, wearables, Internet of Things (IoT) devices, etc. It should also be understood that an actual network arrangement may include any number of UEs being used by any number of users. Thus, the example of a single UE 110 is merely provided for illustrative purposes.

The UE 110 may be configured to communicate with one or more networks. In the example of the network configuration 100, the network with which the UE 110 may wirelessly communicate is a 5G NR radio access network (RAN) 120, a Long Term Evolution (LTE) RAN 122 and a WLAN 124. However, it should be understood that the UE 110 may also communicate with other types of networks (e.g. 5G cloud RAN, legacy cellular network, etc.) and the UE 110 may also communicate with networks over a wired connection. With regard to the exemplary aspects, the UE 110 may establish a connection with the 5G NR RAN 120, the LTE RAN 122 and/or the WLAN 124. Therefore, the UE 110 may have a 5G NR chipset to communicate with the NR RAN 120, an LTE chipset to communicate with the LTE-RAN 122 and an ISM chipset to communicate with the WLAN 124.

The 5G NR RAN 120 and the LTE-RAN 122 may be portions of a cellular network that may be deployed by a network carrier (e.g., Verizon, AT&T, Sprint, T-Mobile, etc.). The RANs 120, 122 may include, for example, cells or base stations (Node Bs, eNodeBs, HeNBs, eNBS, gNBs, gNodeBs, macrocells, microcells, small cells, femtocells, etc.) that are configured to send and receive traffic from UEs that are equipped with the appropriate cellular chip set. The WLAN 124 may include any type of wireless local area network (WiFi, Hot Spot, IEEE 802.11x networks, etc.).

In network arrangement 100, the 5G NR RAN 120 includes a first 5G NR cell 120A and a second 5G NR cell 120B. The LTE-RAN 122 includes a first LTE cell 122A and a second LTE cell 122B. However, an actual network arrangement may include any number of cells being deployed by any number of RANs. Thus, the example of two 5G NR cells 120A, 120B, and two LTE cells 122A, 122B is merely provided for illustrative purposes.

Reference to separate 5G NR-RAN 120 and LTE-RAN 122 is merely provided for illustrative purposes. An actual network arrangement may include a radio access network that includes architecture that is capable of providing both 5G NR RAT and LTE RAT services. For example, a next-generation radio access network (NG-RAN) (not pictured) may include a next generation Node B (gNB) that provides 5G NR services and a next generation evolved Node B (ng-eNB) that provides LTE services. The NG-RAN may be connected to at least one of the evolved packet core (EPC) or the 5G core (5GC). Accordingly, the example of the 5G NR-RAN 120 and the LTE-RAN 122 is merely provided for illustrative purposes.

Returning to the exemplary network arrangement 100, the UE 110 may connect to the 5G NR-RAN 120 via at least one of the cells 120A-120B. The UE 110 may connect to the LTE-RAN 122 via at least one of the cells 122A-122B. Those skilled in the art will understand that any association procedure may be performed for the UE 110 to connect to the 5G NR-RAN 120 or the LTE-RAN 122. For example, as discussed above, the 5G NR-RAN 120 may be associated with a particular cellular provider where the UE 110 and/or the user thereof has a contract and credential information (e.g., stored on a SIM card). Upon detecting the presence of the 5G NR-RAN 120, the UE 110 may transmit the corresponding credential information to associate with the 5G NR-RAN 120. More specifically, the UE 110 may associate with a specific cell (e.g., the cells 120A-120B). Similarly, for access to LTE services, the UE 110 may associate with cell 122A. However, as mentioned above, reference to the 5G NR-RAN 120 and the LTE-RAN 122 is merely for illustrative purposes and any appropriate type of RAN may be used.

In addition to the networks 120-124 the network arrangement 100 also includes a cellular core network 130, the Internet 140, an IP Multimedia Subsystem (IMS) 150, and a network services backbone 160. The cellular core network 130 may be considered to be the interconnected set of components that manages the operation and traffic of the cellular network. The cellular core network 130 also manages the traffic that flows between the cellular network and the Internet 140. The IMS 150 may be generally described as an architecture for delivering multimedia services to the UE 110 using the IP protocol. The IMS 150 may communicate with the cellular core network 130 and the Internet 140 to provide the multimedia services to the UE 110. The network services backbone 160 is in communication either directly or indirectly with the Internet 140 and the cellular core network 130. The network services backbone 160 may be generally described as a set of components (e.g., servers, network storage arrangements, etc.) that implement a suite of services that may be used to extend the functionalities of the UE 110 in communication with the various networks.

Figure 2:
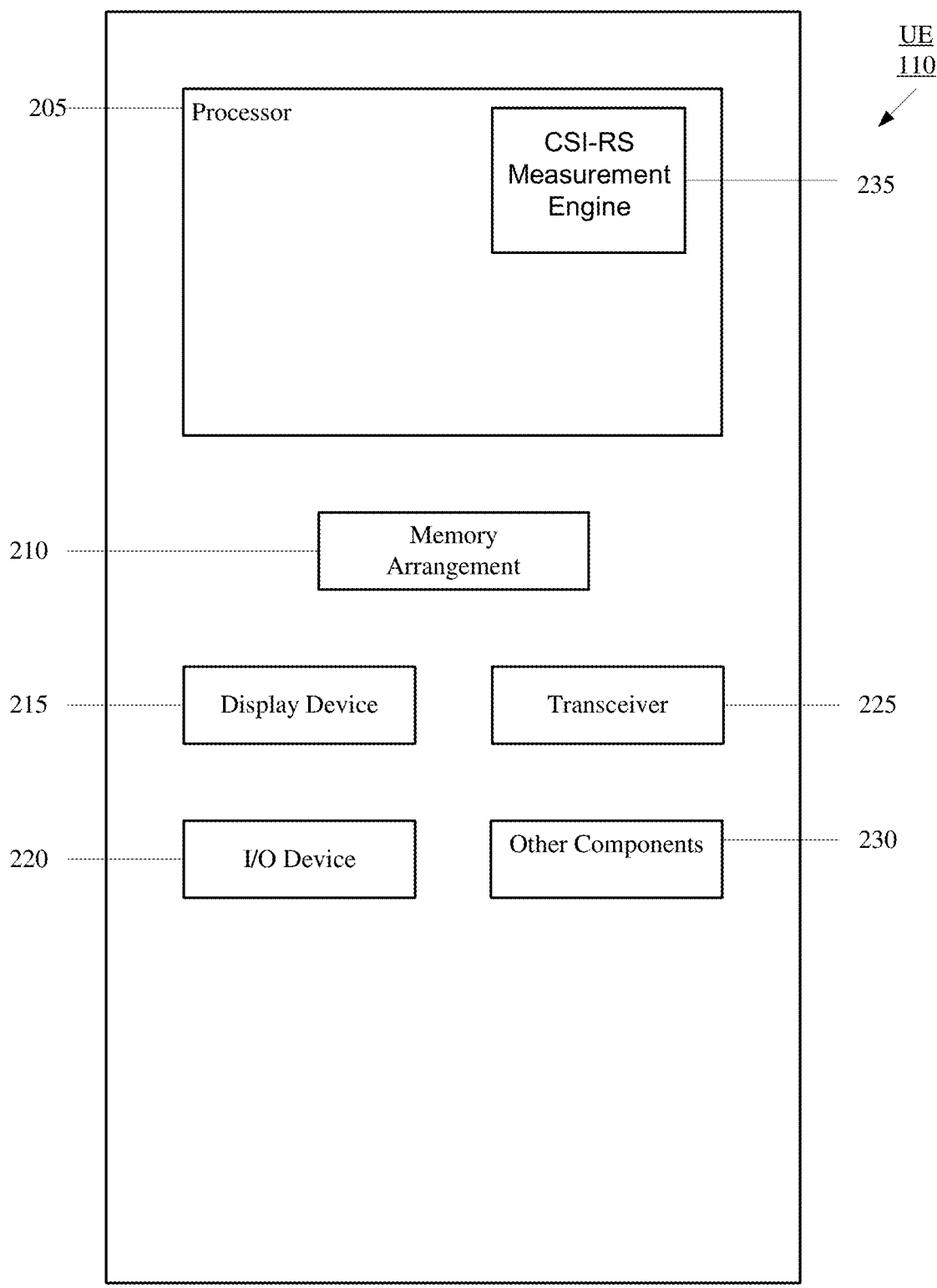
FIG. 2 shows an exemplary user equipment (UE) according to various exemplary aspects.

FIG. 2 shows an exemplary UE 110 according to various exemplary aspects. The UE 110 will be described with regard to the network arrangement 100 of FIG. 1. The UE 110 may represent any electronic device and may include a processor 205, a memory arrangement 210, a display device 215, an input/output (I/O) device 220, a transceiver 225 and other components 230. The other components 230 may include, for example, an audio input device, an audio output device, a battery that provides a limited power supply, a data acquisition device, ports to electrically connect the UE 110 to other electronic devices, etc.

The processor 205 may be configured to execute a plurality of engines of the UE 110. For example, the engines may include a CSI-RS measurement engine 235. The CSI-RS measurement engine 235 may perform operations associated with the UE performing additional synchronization when performing CSI-RS measurements on a target cell when an associated SSB is absent from a measurement configuration received by the UE.

The above referenced engine being an application (e.g., a program) executed by the processor 205 is only exemplary. The functionality associated with the engines may also be represented as a separate incorporated component of the UE 110 or may be a modular component coupled to the UE 110, e.g., an integrated circuit with or without firmware. For example, the integrated circuit may include input circuitry to receive signals and processing circuitry to process the signals and other information. The engines may also be embodied as one application or separate applications. In addition, in some UEs, the functionality described for the processor 205 is split among two or more processors such as a baseband processor and an applications processor. The exemplary aspects may be implemented in any of these or other configurations of a UE.

The memory 210 may be a hardware component configured to store data related to operations performed by the UE 110. The display device 215 may be a hardware component configured to show data to a user while the I/O device 220 may be a hardware component that enables the user to enter inputs. The display device 215 and the I/O device 220 may be separate components or integrated together such as a touchscreen. The transceiver 225 may be a hardware component configured to establish a connection with the 5G NR-RAN 120, the LTE-RAN 122, the WLAN 124, etc. Accordingly, the transceiver 225 may operate on a variety of different frequencies or channels (e.g., set of consecutive frequencies).

Figure 3:
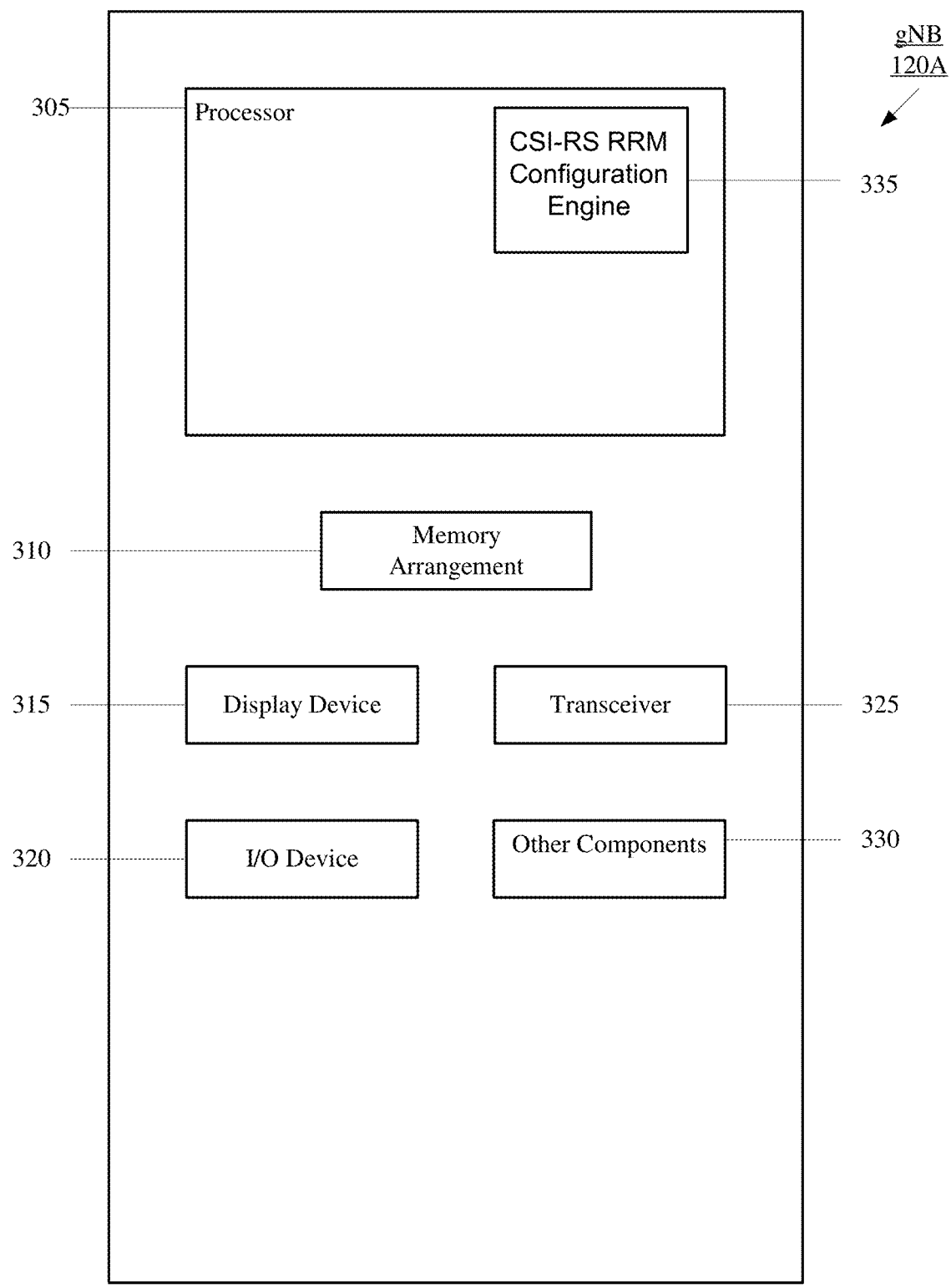
FIG. 3 shows an exemplary network cell according to various exemplary aspects.

FIG. 3 shows an exemplary network cell according to various exemplary aspects. In this example, it may be considered that the network cell is the gNB 120A of FIG. 1. The network cell illustrated in FIG. 3 may also represent the gNB 120B or any other gNB of the 5G NR-RAN 120. The gNB 120A may represent a serving cell for the UE 110. The gNB 120A may represent any access node of the 5G NR network through which the UE 110 may establish a connection and manage network operations.

The gNB 120A may include a processor 305, a memory arrangement 310, an input/output (I/O) device 320, a transceiver 325, and other components 330. The other components 330 may include, for example, an audio input device, an audio output device, a battery, a data acquisition device, ports to electrically connect the gNB 120A to other electronic devices, etc.

The processor 305 may be configured to execute a plurality of engines of the gNB 120A. For example, when the gNB 120A is a serving cell for a UE, the engines may include a CSI-RS RRM configuration engine 335 for providing the UE 110 with configuration information for performing CSI-RS measurements, including CSI-RS measurements of target cells, e.g., the gNB 120B.

The above noted engines each being an application (e.g., a program) executed by the processor 305 is only exemplary. The functionality associated with the engines may also be represented as a separate incorporated component of the gNB 120A or may be a modular component coupled to the gNB 120A, e.g., an integrated circuit with or without firmware. For example, the integrated circuit may include input circuitry to receive signals and processing circuitry to process the signals and other information. In addition, in some gNBs, the functionality described for the processor 305 is split among a plurality of processors (e.g., a baseband processor, an applications processor, etc.). The exemplary aspects may be implemented in any of these or other configurations of a gNB.

The memory 310 may be a hardware component configured to store data related to operations performed by the UEs 110, 112. The I/O device 320 may be a hardware component or ports that enable a user to interact with the gNB 120A. The transceiver 325 may be a hardware component configured to exchange data with the UEs 110, 112 and any other UE in the system 100, e.g. if the gNB 120A serves as a PCell or an SCell to either or both of the UEs 110, 112. The transceiver 325 may operate on a variety of different frequencies or channels (e.g., set of consecutive frequencies). Therefore, the transceiver 325 may include one or more components (e.g., radios) to enable the data exchange with the various networks and UEs.

Figure 4:
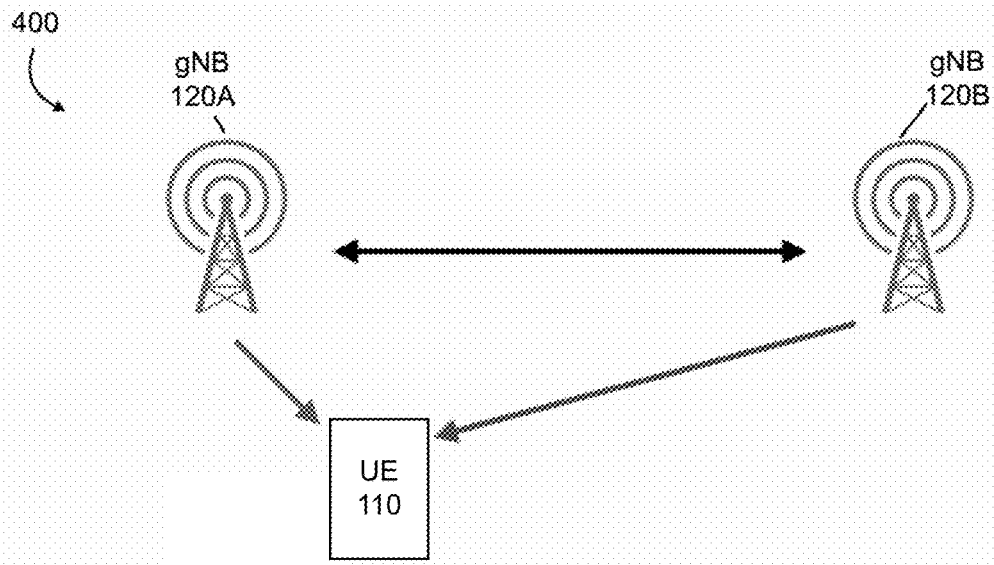
FIG. 4 shows a portion of the exemplary network arrangement of FIG. 1 according to various exemplary aspects.

FIG. 4 shows a portion of the exemplary network arrangement 100 of FIG. 1 according to various exemplary aspects. FIG. 4 shows the UE 110, the gNB 120A and the gNB 120B. In this example, it may be considered that the gNB 120A is the serving cell for the UE 110 and the gNB 120B is a neighbor cell. As described above, the UE 110 may perform CSI-RS RRM measurements on CSI-RS transmitted by the serving gNB 120A and the neighbor cell gNB 120B. For purposes of CSI-RS RRM, the gNB 120B may also be referred to as a "target cell."

Figure 5:
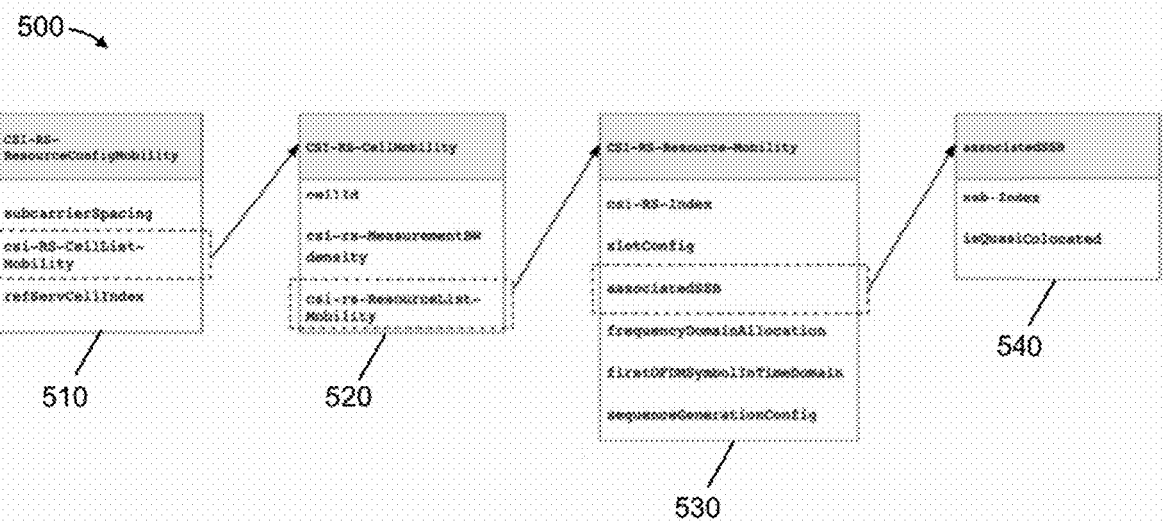
FIG. 5 shows an example of information received by the UE in a radio resource management (RRM) measurement configuration message.

To perform these measurements, the UE 110 receives a RRM measurement configuration from the serving gNB 120A via RRC signaling. The RRM measurement configuration may include information such as CSI-RS resource information, cell IDs, and associated SSB indication. FIG. 5 shows an example of information 500 received by the UE 110 in a RRM measurement configuration message. The example of FIG. 5 shows the information 500 as specified by 3GPP Technical Specification (TS) 38.331. The following description will refer to this information by example in describing the various exemplary aspects. However, as described above, the use of the CSI-RS RRM is only an example and the measurement of other reference signals may be configured in a different manner.

In FIG. 5, the information 500 includes a CSI-RS-ResourceConfigMobility Information Element (IE) 510, a CSI-RS-CellMobility IE 520, a CSI-RS-Resource-Mobility IE 530 and an associatedSSB IE 540. The relationship between the IEs 510-540 and the various information that is included in each of the IEs 510-540 is shown in FIG. 5. However, while FIG. 5 shows the information 500 that the UE 110 may receive in the RRM measurement configuration message, the UE 110 may not actually receive all the information 500. The UE 110 needs to determine operations for CSI-RS RRM when it does not receive all the information 500.

The following provides various exemplary scenarios of operation for the UE 110 based on the information 500 received in the RRM measurement configuration. For example, if the associatedSSB IE 540 is present, the UE 110 may base the timing of the CSI-RS resource indicated in CSI-RS-Resource-Mobility IE 530 on the timing of the cell indicated by the cellId in the CSI-RS-CellMobility IE 520. In this case, the UE 110 is not required to monitor that CSI-RS resource if the UE 110 cannot detect the synchronization signals (SS) and physical broadcast channel (PBCH) SS/PBCH block indicated by this associatedSSB IE 540 and cellId. If associatedSSB IE 540 is absent, the UE 110 may base the timing of the CSI-RS resource indicated in CSI-RS-Resource-Mobility IE 530 on the timing of the serving gNB 120A indicated by refServCellIndex in the CSI-RS-ResourceConfigMobility IE 510. In this case, the UE 110 may measure the CSI-RS resource even if SS/PBCH block(s) with cellId in the CSI-RS-CellMobility IE 520 are not detected.

In other scenarios, if the UE 110 is configured with the higher layer parameter of the CSI-RS-Resource-Mobility and the higher layer parameter of the associatedSSB is not configured, the UE 110 will perform measurements based on CSI-RS-Resource-Mobility IE 530 and the UE 110 may base the timing of the CSI-RS resource on the timing of the serving gNB 120A.

In further scenarios, if the UE 110 is configured with the higher layer parameters of the CSI-RS-Resource-Mobility and associatedSSB, the UE 110 may base the timing of the CSI-RS resource on the timing of the cell given by the cellId of the CSI-RS resource configuration (e.g., neighbor gNB 120B). Additionally, for a given CSI-RS resource, if the associated SS/PBCH block is configured but not detected by the UE 110, the UE 110 is not required to monitor the corresponding CSI-RS resource.

Thus, in the above described scenarios, there are instances where the UE 110 will use the timing of the serving gNB 120A indicated by refServCellIndex for the purposes of measuring CSI-RS of the neighbor cell gNB 120B. However, there may be a timing misalignment between the serving gNB 120A and the neighbor cell 120B due to, for example, the cell phase synchronization error, UE location, etc. Therefore, even though the network may indicate the UE 110 can use the timing of the serving gNB 120A, the UE 110 may still need to do additional synchronization for sufficient timing/frequency information to measure the neighbor gNB 120B CSI-RS. The following will describe examples of the UE 110 performing such additional synchronization.

The exemplary aspects are described with reference to two scenarios. In both scenarios, the UE 110 may be configured to measure the CSI-RS of the target gNB 120B but the associated SSB is absent in the RRM measurement configuration. In a first scenario, the target gNB 120B may actually have an SSB transmission. In the second scenario, target gNB 120B may not be performing SSB transmissions. In both scenarios, the serving gNB 120A may indicate to the UE 110 whether or not the target gNB 120B has an SSB transmission. The UE 110 may use this information, e.g., whether or not the target gNB 120B has an SSB transmission, to determine operations with respect to CSI-RS measurements on the target gNB 120B. As will be described in greater detail below for both scenarios, in some instances the network (e.g., the serving gNB 120A) will provide additional information over and above the indication that the target gNB 120B is or is not performing SSB transmissions to assist the UE 110 in determining the operations to perform with respect to CSI-RS measurements on the target gNB 120B.

The following describes various exemplary aspects related to the first scenario where the UE is configured to perform CSI-RS measurements for the target gNB 120B but the associated SSB is absent from the RRM measurement configuration even though the target gNB 120B transmits an SSB.

Figure 6:
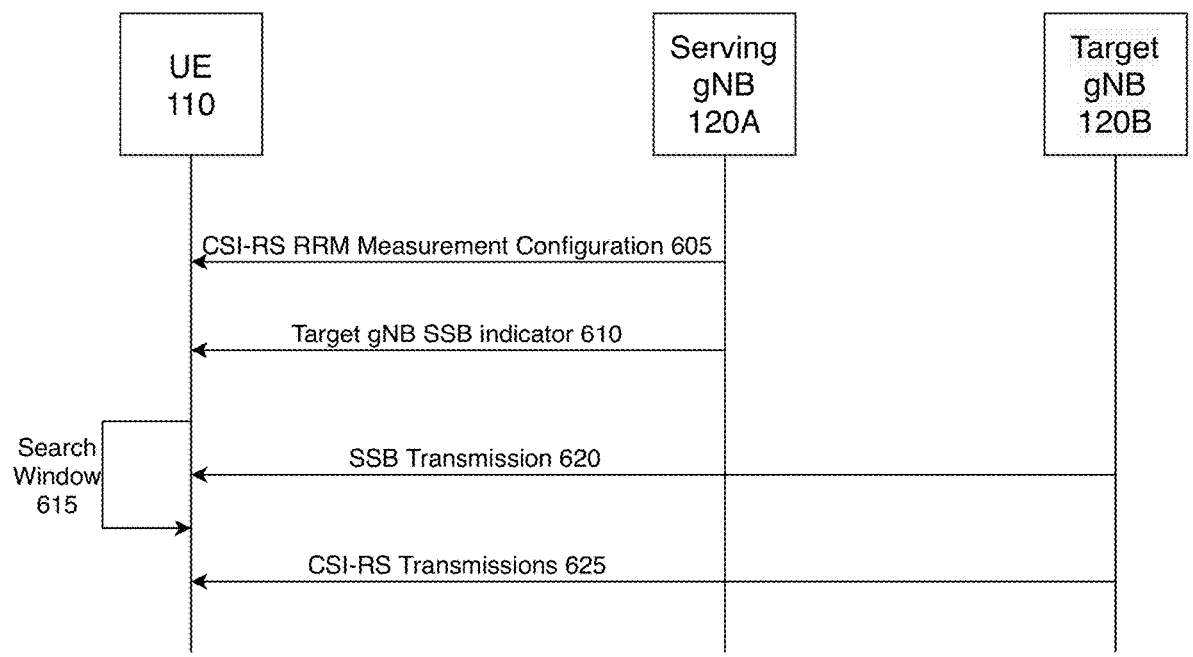
FIG. 6 shows a first exemplary signaling diagram for the UE to measure CSI-RS from the target gNB when the associated Synchronization Signal Block (SSB) is absent from the RRM measurement configuration but the target gNB transmits SSBs according to various exemplary aspects.

FIG. 6 shows a first exemplary signaling diagram 600 for the UE 110 to measure CSI-RS from the target gNB 120B when the associated SSB is absent from the RRM measurement configuration but the target gNB 120B transmits SSBs according to various exemplary aspects. As will be described in greater detail below, in this exemplary aspect, the UE 110 will synchronize to the SSB of the target gNB 120B to obtain the accurate timing and frequency information of the target gNB 120B.

In 605, the serving gNB 120A transmits a CSI-RS RRM measurement configuration message to the UE 110. Various information that may be included in the CSI-RS RRM measurement configuration message has been described above. The CSI-RS RRM measurement configuration message may indicate that the UE 110 is to measure the CSI-RS of the target gNB 120B. However, in this example, it may be considered that the CSI-RS RRM measurement configuration message does not include the associated SSB for the target gNB 120B.

In 610, the serving gNB 120A may also send a message that indicates that the target gNB 120B is transmitting an SSB. It should be understood that the information in message 610 may also be sent as part of the RRM measurement configuration message 605. Further, it should be understood that serving gNB 120A and target gNB 120B may exchange information that allows the serving gNB 120A to understand that the target gNB 120B is transmitting SSBs. In other exemplary aspects, the serving gNB 120A may understand that the target gNB 120B is transmitting SSBs based on information received from the core network 130. It should be understood that throughout this description where it is described that the serving gNB 120A and the target gNB 120B are exchanging any type of information, this exchange may take place via a direct communication between the gNBs (e.g., via the X2 interface) or an indirect communication via the core network 130.

In 615, the UE 110 determines a search window to search for the SSB transmission of the target gNB 120B. Since, in 610, the UE 110 is informed by the serving gNB 120A that the target gNB 120B is transmitting a SSB, the UE 110 may then attempt to receive the target gNB 120B SSB transmission. The UE 110 may determine the search window based on the timing of the serving gNB 120A. For example, because the serving gNB 120A and target gNB 120B are neighbors, the 5G network should configure the SSB transmissions of the gNB 120A and gNB 120B relative to each other. The UE 110 may understand this relationship between SSB transmissions of neighbor cells and select a search window that should include the SSB of the target gNB 120B.

In this example, it may be considered that the UE 110 receives the target gNB 120B SSB transmission 620 in the search window 615. The UE 110 will now have accurate timing and frequency information to perform target gNB 120B CSI-RS measurements. For example, the target gNB 120B may transmit CSI-RS transmissions 625 and because the UE 110 understands the timing and frequency information based on receiving the target gNB 120B SSB transmission 620, the UE 110 may perform the CSI-RS measurements on the CSI-RS transmissions 625 of the target gNB 120B.

Figure 7:
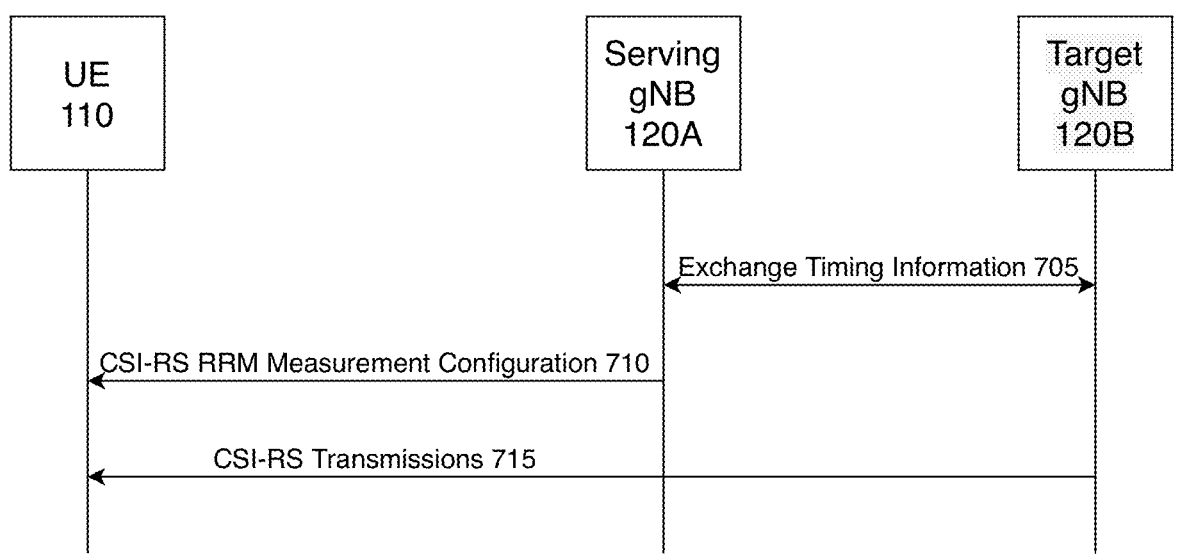
FIG. 7 shows a second exemplary signaling diagram for the UE to measure CSI-RS from the target gNB when the associated SSB is absent from the RRM measurement configuration but the target gNB transmits SSBs according to various exemplary aspects.

FIG. 7 shows a second exemplary signaling diagram 700 for the UE 110 to measure CSI-RS from the target gNB 120B when the associated SSB is absent from the RRM measurement configuration but the target gNB 120B transmits SSBs according to various exemplary aspects. As will be described in greater detail below, in this exemplary aspect, the UE 110 will receive information from the serving gNB 120A for the target gNB 120B.

In 705, the serving gNB 120A and the target gNB 120B may exchange various information that includes timing/frequency information for the target gNB 120B. In 710, the serving gNB 120A transmits a CSI-RS RRM measurement configuration message to the UE 110. Again, in this example, it may be considered that the CSI-RS RRM measurement configuration message 710 does not include the associated SSB for the target gNB 120B. However, the CSI-RS RRM measurement configuration message 710 may include the timing/frequency information for the target gNB 120B. It should be understood that the timing/frequency information for the target gNB 120B may also be transmitted from the serving gNB 120A to the UE 110 in a separate message from the CSI-RS RRM measurement configuration message 710.

In some exemplary aspects, the actual timing/frequency information for the target gNB 120B may be provided to the UE 110. In other exemplary aspects, the timing/frequency information for the target gNB 120B may be indicated as an offset to the timing/frequency of the serving gNB 120A, e.g., the UE 110 may derive the target gNB 120B timing/frequency based on the offset from the serving gNB 120A timing. In some exemplary aspects, if the offset=0, the serving gNB 120A may indicate a single bit to the UE 110 to represent the perfect timing alignment between serving gNB 120A and the target gNB 120B.

In 715, the target gNB 120B may transmit CSI-RS transmissions and because the UE 110 understands the timing and frequency information (e.g., based on receiving the offset information), the UE 110 may perform the CSI-RS measurements on the CSI-RS transmissions 715 of the target gNB 120B. Because the UE 110 received the timing/frequency information for the target gNB 120B from the serving gNB 120A, the UE 110 may skip synchronizing with the target gNB 120B to receive the SSB transmission as was performed above with respect signaling diagram 600 of FIG. 6.

Figure 8:
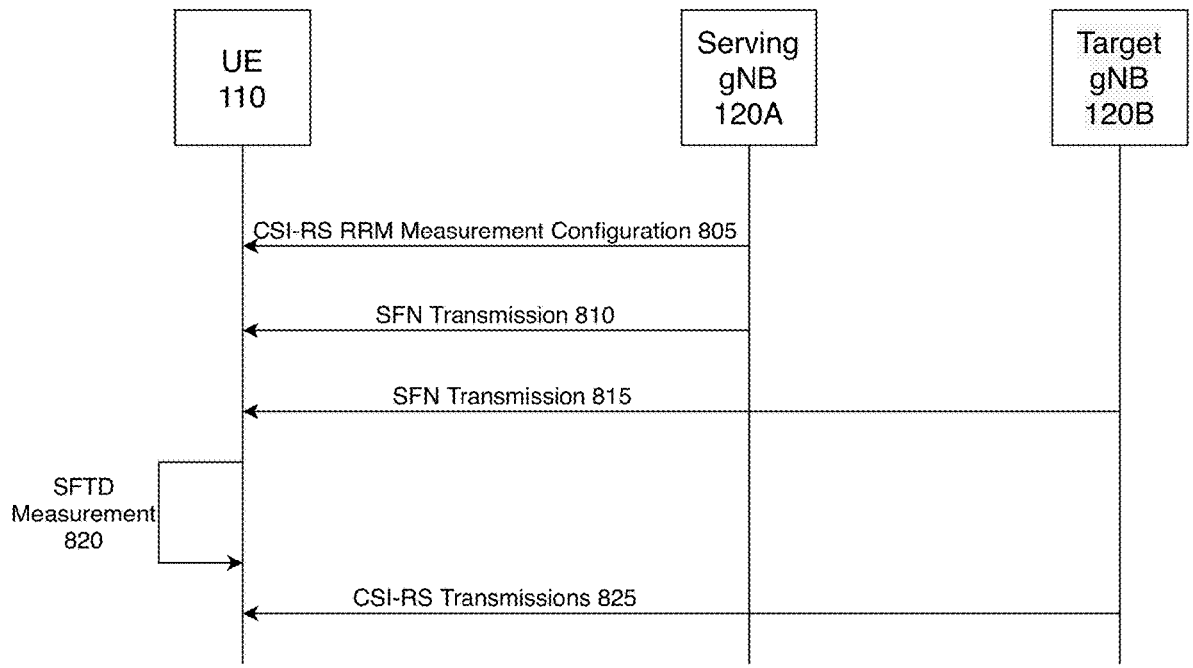
FIG. 8 shows a third exemplary signaling diagram for the UE to measure CSI-RS from the target gNB when the associated SSB is absent from the RRM measurement configuration but the target gNB transmits SSBs according to various exemplary aspects.

FIG. 8 shows a third exemplary signaling diagram 800 for the UE 110 to measure CSI-RS from the target gNB 120B when the associated SSB is absent from the RRM measurement configuration but the target gNB 120B transmits SSBs according to various exemplary aspects. As will be described in greater detail below, in this exemplary aspect, the UE 110 will be configured to perform System Frame Number (SFN) and Frame Timing Difference (SFTD) measurements between the serving gNB 120A for the target gNB 120B.

In 805, the serving gNB 120A transmits a CSI-RS RRM measurement configuration message to the UE 110 that again includes information indicating the UE 110 is to measure the CSI-RS of the target gNB 120B but does not include the associated SSB for the target gNB 120B. In this exemplary aspect, the CSI-RS RRM measurement configuration message may also include configuration information indicating the UE 110 is to perform additional SFTD measurements between the serving gNB 120A and the target gNB 120B.

In 810, the serving gNB 120A transmits one or more SFN transmissions and in 815, the target gNB 120B transmits one or more SFN transmissions. The SFN transmission 810 and 815 do not refer to any particular type of transmissions, but merely refer to frame transmissions by the gNBs 120A-B that have system frame numbers. SFN refers to system frame numbers and is a 10 bit indication that numbers frames consecutively from 0 to 1023 in 5G networks.

In 820, the UE 110 performs the SFTD measurements based on the SFN transmissions 810 and 820. SFTD measurements allow the UE 110 to measure the timing difference of the SFN and frame boundary between the serving gNB 120A and the target gNB 120B. The UE 110 may then use this timing difference together with the serving gNB 120A timing indicated by, for example, the refServCellIndex, to determine the timing for the CSI-RS for the target gNB 120B.

In 825, the target gNB 120B may transmit CSI-RS transmissions and because the UE 110 understands the timing information for the target gNB 120B from the SFTD measurements and the serving gNB 120A timing, the UE 110 may perform the CSI-RS measurements on the CSI-RS transmissions 825 of the target gNB 120B. In other exemplary aspects, similar to the signaling diagram 600 described above, the UE 110 may use the timing information from the SFTD measurements and the serving gNB 120A timing to locate and synchronize with the SSB of the target gNB 120B to determine the exact timing of the CSI-RS transmissions 825 of the target gNB 120B.

Figure 9:
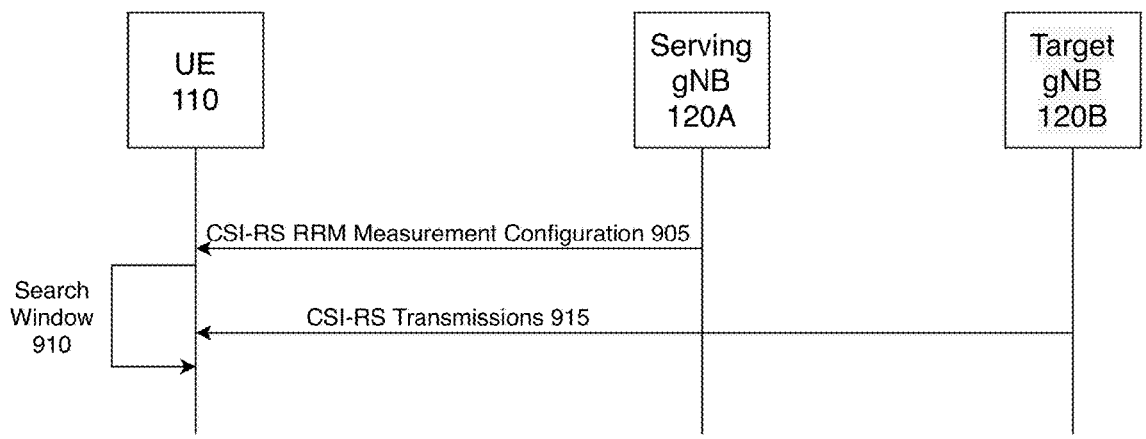
FIG. 9 shows a fourth exemplary signaling diagram for the UE to measure CSI-RS from the target gNB when the associated SSB is absent from the RRM measurement configuration but the target gNB transmits SSBs according to various exemplary aspects.

FIG. 9 shows a fourth exemplary signaling diagram 900 for the UE 110 to measure CSI-RS from the target gNB 120B when the associated SSB is absent from the RRM measurement configuration but the target gNB 120B transmits SSBs according to various exemplary aspects. As will be described in greater detail below, in this exemplary aspect, the UE 110 may determine a search window for the CSI-RS transmissions from the target gNB 120B.

In 905, the serving gNB 120A transmits a CSI-RS RRM measurement configuration message to the UE 110 that again includes information indicating the UE 110 is to measure the CSI-RS of the target gNB 120B but does not include the associated SSB for the target gNB 120B.

In 910, the UE 110 may determine a search window for the CSI-RS transmissions of the target gNB 120B based on the timing of the serving gNB 120A. As described above, the CSI-RS RRM measurement configuration message will include the timing for the serving gNB 120A. This timing may be used to locate the CSI-RS of the target gNB 120B. The search window 910 range will take into account a cell phase synchronization error and possible propagation delay differences between the serving gNB 120A and the target gNB 120B.

The cell phase synchronization error may be a value that is related to a minimum requirement for this parameter in a relevant standard, e.g., the 3GPP specifications. This may be added to possible propagation delay differences between the serving gNB 120A and the target gNB 120B. The UE 110 is aware of its own location and the location of the gNBs 120A-B and may, for example, estimate the possible propagation delay differences. It has been shown that by using this technique, that the search window 910 will be approximately ±min (2 SSB symbols, 1 Physical Downlink Shared Channel (PDSCH) symbol).

In this example, it may be considered that the UE 110 has selected the proper search window 910 and receives the CSI-RS transmission 915 from the target gNB 120B. The UE 110 may perform the CSI-RS measurements on the CSI-RS transmissions 915 of the target gNB 120B.

The following describes various exemplary aspects related to the second scenario where the UE is configured to perform CSI-RS measurements for the target gNB 120B but the associated SSB is absent from the RRM measurement configuration because the target gNB 120B does not transmit SSBs.

Figure 10:
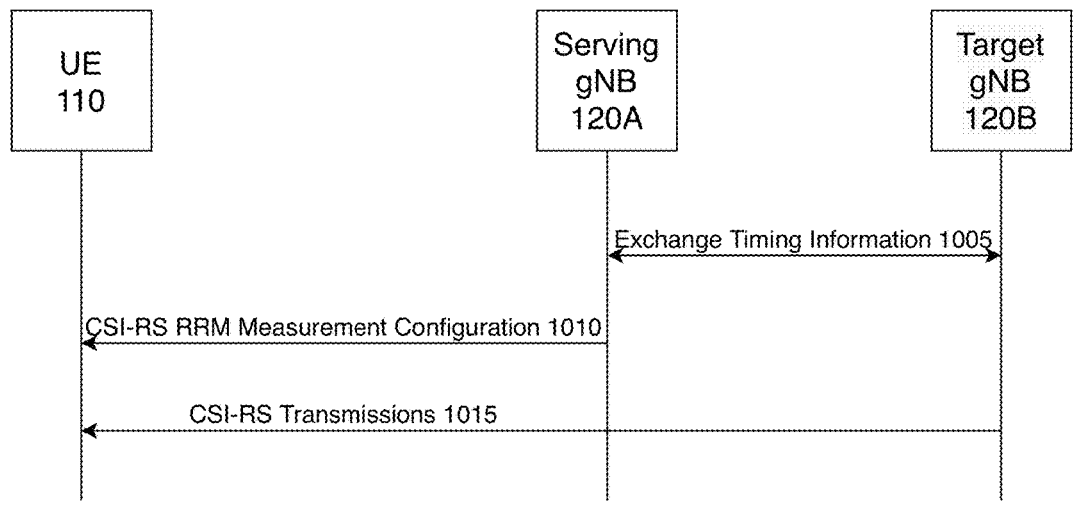
FIG. 10 shows a first exemplary signaling diagram for the UE to measure CSI-RS from the target gNB when the associated SSB is absent from the RRM measurement configuration because the target gNB does not transmit SSBs according to various exemplary aspects.

FIG. 10 shows a first exemplary signaling diagram 1000 for the UE 110 to measure CSI-RS from the target gNB 120B when the associated SSB is absent from the RRM measurement configuration because the target gNB 120B does not transmit SSBs according to various exemplary aspects. As will be described in greater detail below, in this exemplary aspect, the UE 110 will receive information from the serving gNB 120A for the target gNB 120B. The signaling diagram 1000 is substantially similar to the signaling diagram 700 of FIG. 7.

In 1005, the serving gNB 120A and the target gNB 120B may exchange various information that includes timing/frequency information for the target gNB 120B. In 1010, the serving gNB 120A transmits a CSI-RS RRM measurement configuration message to the UE 110. The CSI-RS RRM measurement configuration message 1010 may include the timing/frequency information for the target gNB 120B. It should be understood that the timing/frequency information for the target gNB 120B may also be transmitted from the serving gNB 120A to the UE 110 in a separate message from the CSI-RS RRM measurement configuration message 1010.

In some exemplary aspects, the actual timing/frequency information for the target gNB 120B may be provided to the UE 110. In other exemplary aspects, the timing/frequency information for the target gNB 120B may be indicated as an offset to the timing/frequency of the serving gNB 120A, e.g., the UE 110 may derive the target gNB 120B timing/frequency based on the offset from the serving gNB 120A timing. In some exemplary aspects, if the offset=0, the serving gNB 120A may indicate a single bit to the UE 110 to represent the perfect timing alignment between serving gNB 120A and the target gNB 120B.

In 1015, the target gNB 120B may transmit CSI-RS transmissions and because the UE 110 understands the timing and frequency information (e.g., based on receiving the offset information), the UE 110 may perform the CSI-RS measurements on the CSI-RS transmissions 1015 of the target gNB 120B.

Figure 11:
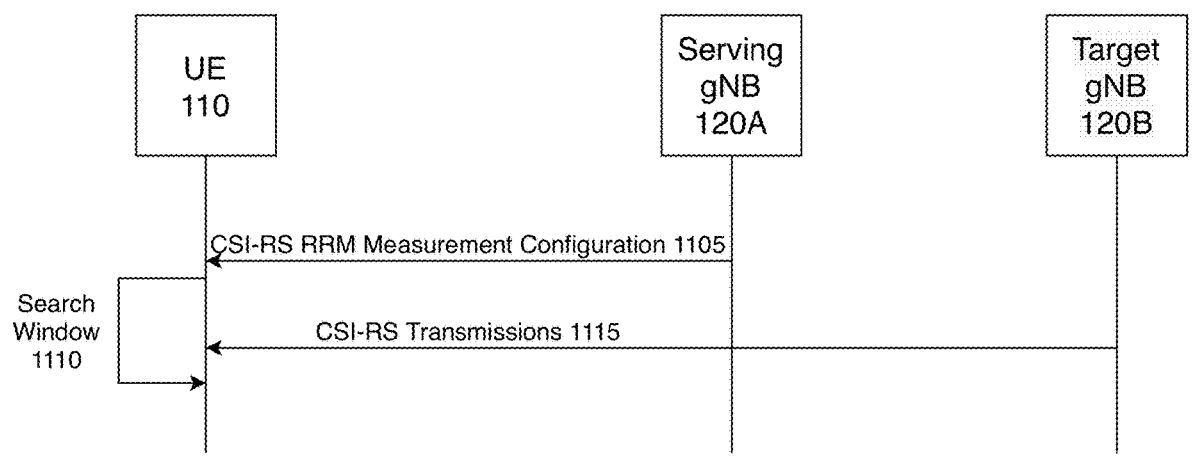
FIG. 11 shows a second exemplary signaling diagram for the UE to measure CSI-RS from the target gNB when the associated SSB is absent from the RRM measurement configuration because the target gNB does not transmit SSBs according to various exemplary aspects.

FIG. 11 shows a second exemplary signaling diagram 1100 for the UE 110 to measure CSI-RS from the target gNB 120B when the associated SSB is absent from the RRM measurement configuration because the target gNB 120B does not transmit SSBs according to various exemplary aspects. As will be described in greater detail below, in this exemplary aspect, the UE 110 may determine a search window for the CSI-RS transmissions from the target gNB 120B. The signaling diagram 1100 is substantially similar to the signaling diagram 900 of FIG. 9.

In 1105, the serving gNB 120A transmits a CSI-RS RRM measurement configuration message to the UE 110 that again includes information indicating the UE 110 is to measure the CSI-RS of the target gNB 120B but does not include the associated SSB for the target gNB 120B because the target gNB 120B does not transmit SSBS.

In 1110, the UE 110 may determine a search window for the CSI-RS transmissions of the target gNB 120B based on the timing of the serving gNB 120A. As described above, the CSI-RS RRM measurement configuration message will include the timing for the serving gNB 120A. This timing may be used to locate the CSI-RS of the target gNB 120B. The search window 910 range will take into account a cell phase synchronization error and possible propagation delay differences between the serving gNB 120A and the target gNB 120B.

The cell phase synchronization error may be a value that is related to a minimum requirement for this parameter in a relevant standard, e.g., the 3GPP specifications. This may be added to possible propagation delay differences between the serving gNB 120A and the target gNB 120B. The UE 110 is aware of its own location and the location of the gNBs 120A-B and may, for example, estimate the possible propagation delay differences. It has been shown that by using this technique, that the search window 1110 will be approximately ±1 PDSCH symbol. The difference between the signaling diagram 1100 and 900 is that in signaling diagram 900, the search window may be ±2 SBB symbols. However, as described above, in this scenario, the target gNB 120B does not transmit SSBs, thus the search window cannot be described with reference to SSB symbols.

In this example, it may be considered that the UE 110 has selected the proper search window 1110 and receives the CSI-RS transmission 1115 from the target gNB 120B. The UE 110 may perform the CSI-RS measurements on the CSI-RS transmissions 1115 of the target gNB 120B.

Those skilled in the art will understand that the above-described exemplary aspects may be implemented in any suitable software or hardware configuration or combination thereof. An exemplary hardware platform for implementing the exemplary aspects may include, for example, an Intel x86 based platform with compatible operating system, a Windows OS, a Mac platform and MAC OS, a mobile device having an operating system such as iOS, Android, etc. The exemplary aspects of the above described method may be embodied as a program containing lines of code stored on a non-transitory computer readable storage medium that, when compiled, may be executed on a processor or microprocessor.

Although this application described various aspects each having different features in various combinations, those skilled in the art will understand that any of the features of one aspect may be combined with the features of the other aspects in any manner not specifically disclaimed or which is not functionally or logically inconsistent with the operation of the device or the stated functions of the disclosed aspects.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

It will be apparent to those skilled in the art that various modifications may be made in the present disclosure, without departing from the spirit or the scope of the disclosure. Thus, it is intended that the present disclosure cover modifications and variations of this disclosure provided they come within the scope of the appended claims and their equivalent.

What is claimed:

1. A method, comprising:
   at a base station of a network operating as a serving cell for a user equipment (UE):
   determining whether a target cell of the network transmits Synchronization Signal Block (SSB) information; and
   transmitting, to the UE, a measurement configuration message indicating the UE is to measure channel state information reference signals (CSI-RS) from the target cell, wherein the measurement configuration message does not include the SSB information for the target cell but comprises an indication of whether the target cell transmits the SSB information, wherein a search window for the CSI-RS measurement used by the UE is based at least on a timing of the serving cell and a range of the search window is equal to a duration of one of i) two SSB symbols or ii) one physical downlink shared channel (PDSCH) symbol based on a cell phase synchronization error plus an estimated propagation delay between the serving cell and the target cell.

2. The method of claim 1, wherein the measurement configuration message indicates the target cell transmits the SSB information.

3. The method of claim 1, wherein the measurement configuration message indicates the target cell does not transmit the SSB information.

4. The method of claim 2, further comprising:
   exchanging timing information with the target cell; and determining an offset value between a timing of the serving cell and the timing of the target cell, wherein the measurement configuration message comprises the timing of the serving cell and the offset value.

5. The method of claim 4, wherein the offset value is indicated by a single bit in the measurement configuration message in response to the offset value being equal to 0.

6. The method of claim 1, wherein the measurement configuration message further comprises the timing of the serving cell.

7. The method of claim 2, wherein the measurement configuration message further comprises configuration information indicating the UE is to perform System Frame Number (SFN) and Frame Timing Difference (SFTD) measurements between the serving cell and the target cell.

8. A base station of a network operating as a serving cell for a user equipment (UE), comprising:
one or more processors configured to:
determine whether a target cell of the network transmits Synchronization Signal Block (SSB) information; and
configure a measurement configuration message indicating the UE is to measure channel state information reference signals (CSI-RS) from the target cell, wherein the measurement configuration message does not include the SSB information for the target cell but comprises an indication of whether the target cell transmits the SSB information, wherein a search window for the CSI-RS measurement used by the UE is based at least on a timing of the serving cell and a range of the search window is equal to a duration of one of i) two synchronization signal block (SSB) symbols or ii) one physical downlink shared channel (PDSCH) symbol based on a cell phase synchronization error plus an estimated propagation delay between the serving cell and the target cell; and
a transceiver to transmit the measurement configuration message to the UE.

9. The base station of claim 8, wherein the measurement configuration message indicates the target cell transmits the SSB information.

10. The base station of claim 8, wherein the measurement configuration message indicates the target cell does not transmit the SSB information.

11. The base station of claim 10, wherein the one or more processors are further configured to:
exchange timing information with the target cell; and
determine an offset value between the timing of the serving cell and a timing of the target cell, wherein the measurement configuration message comprises the timing of the serving cell and the offset value.

12. The base station of claim 11, wherein the offset value is indicated by a single bit in the measurement configuration message in response to the offset value being equal to 0.

13. The base station of claim 8, wherein the measurement configuration message further comprises the timing of the serving cell.

14. The base station of claim 8, wherein the measurement configuration message further comprises configuration information indicating the UE is to perform System Frame Number (SFN) and Frame Timing Difference (SFTD) measurements between the serving cell and the target cell.

15. A non-transitory computer readable storage medium comprising instructions that when executed by a processor of a network base station operating as a serving cell for a user equipment (UE) perform operations, comprising:
determining whether a target cell of a network transmits Synchronization Signal Block (SSB) information; and
transmitting, to the UE, a measurement configuration message indicating the UE is to measure channel state information reference signals (CSI-RS) from the target cell, wherein the measurement configuration message does not include the SSB information for the target cell but further comprises an indication of whether the target cell transmits the SSB information, wherein a search window for the CSI-RS measurement used by the UE is based at least on a timing of the serving cell and a range of the search window is equal to a duration of one of i) two synchronization signal block (SSB) symbols or ii) one physical downlink shared channel (PDSCH) symbol based on a cell phase synchronization error plus an estimated propagation delay between the serving cell and the target cell.

16. The non-transitory computer readable storage medium of claim 15, wherein the measurement configuration message indicates the target cell transmits the SSB information.

17. The non-transitory computer readable storage medium of claim 15, wherein the measurement configuration message indicates the target cell does not transmit the SSB information.

18. The non-transitory computer readable storage medium of claim 15, wherein an offset value is indicated by a single bit in the measurement configuration message in response to the offset value being equal to 0.

19. The non-transitory computer readable storage medium of claim 15, wherein the measurement configuration message further comprises the timing of the serving cell.

20. The non-transitory computer readable storage medium of claim 16, wherein the measurement configuration message further comprises configuration information indicating the UE is to perform System Frame Number (SFN) and Frame Timing Difference (SFTD) measurements between the serving cell and the target cell.

* * * * *